United States Patent

[11] 3,613,563

| [72] | Inventors | Mikhail Yakovlevich Meshengisser<br>ulitsa Sumskaya, 126, kv. 5, Kharkov;<br>Ivan Semenovich Ermakov, prospekt<br>Pravdy 7, kv. 44, Kharkov; Georgy<br>Mikhailovich Kochkin, ulitsa 23 avgusta,<br>29, kv. 161, Kharkov; Alexandr<br>Viktorovich Stankun, Karpovsky pereulok,<br>10, Kharkov; Filipp Nikolaevich Shakhov,<br>ulitsa chaikovskogo, 25, kv. 23, Kharkov;<br>Ilya Pinkhusovich Velednitsky, ulitsa K.<br>Libknekhta, 32/1, kv. 19, Berdichev; Petr<br>Petrovich Yagodin, ulitsa pushkinskava,<br>54, kv. 1, Berdichev, all of U.S.S.R. |
|---|---|---|
| [21] | Appl. No. | 36,652 |
| [22] | Filed | May 12, 1970 |
| [45] | Patented | Oct. 19, 1971 |
| [32] | Priority | July 7, 1969 |
| [33] | | U.S.S.R. |
| [31] | | 1345953 |

[54] FILTER PRESS
2 Claims, 5 Drawing Figs.

[52] U.S. Cl. .................................................. 100/115,
100/198, 100/211, 210/225
[51] Int. Cl. ...................................................... B30b 9/06,
B01d 25/32
[50] Field of Search ............................................ 100/112,
113, 114, 115, 122–125, 211, 222, 198; 210/225,
229

[56] References Cited
UNITED STATES PATENTS

| 3,098,429 | 7/1963 | Hagglund ..................... | 100/115 |
|---|---|---|---|
| 3,270,887 | 9/1966 | Juhasz et al. .................. | 100/211 X |
| 3,289,844 | 12/1966 | Emele .......................... | 100/198 X |
| 3,342,123 | 9/1967 | Ermakov et al. ............... | 100/115 |
| 3,360,130 | 12/1967 | Kaga ........................... | 210/225 |

*Primary Examiner*—Peter Feldman
*Attorney*—Holman & Stern

ABSTRACT: A filter press with vertical filter plates characterized in that each filter plate has guide rollers at the upper and lower parts thereof and is limited by a flat draining surface on one side and a concave draining surface on the other while the filter cloth in the form of a continuous band passes consecutively between the adjacent filter plates so that, resting on the guide rollers, it covers twice the draining surface of each filter plate. When the filter plates are spread apart one after another in the direction of the longitudinal axis of the set, the length of the filter cloth adjoining the filter plate being moved is also shifted with relation to the latter, thus carrying outside the cake formed in the filtering chamber.

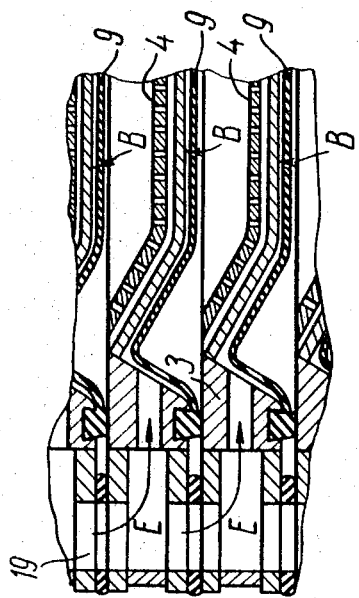
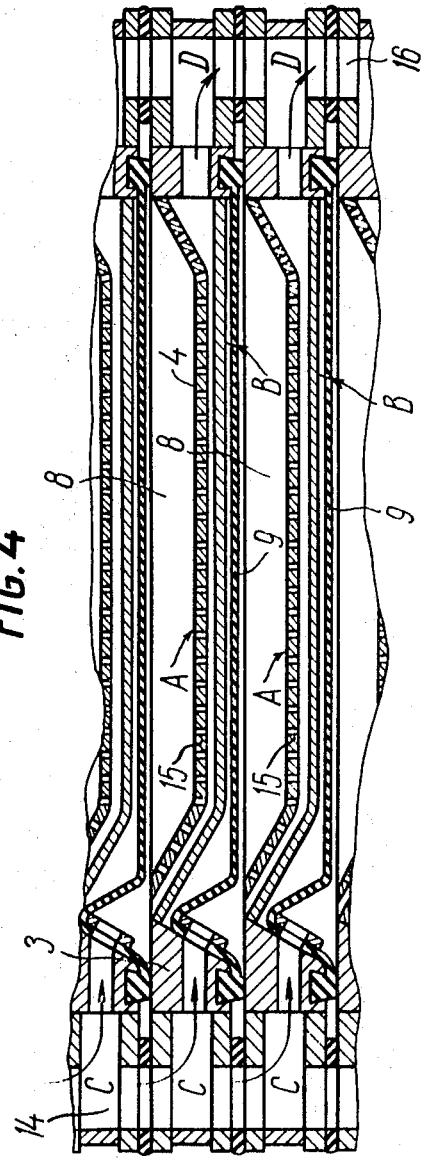

FILTER PRESS

The invention relates to the devices for separating suspensions and more specifically it relates to filter presses.

Known in the art are presses comprising a set of filter plates clamped in the working position between the thrust and pressure plates, said filter plates having draining surfaces covered with at least one layer of filter cloth and forming filtering chambers for receiving the suspension and forming the cake, the latter being unloaded by spreading the plates apart along the longitudinal axis of the set.

In these known filter presses each filter plate is limited on both sides by concave draining surfaces and the filter cloth is permanently fixed to these plate.

While the suspension is being filtered the liquid passes through the filter cloth and the solid phase settles on its surface. After the filtering chambers have been filled with cake, the plates are moved one after another along the longitudinal of the set whereupon the cake is unloaded manually.

In view of the fact that the cake cannot, in the majority of cases, be completely detached from the filter cloth by the force of gravity alone, particularly when the cake has a high moisture content, its complete unloading involves hard labor. Besides, a serious disadvantage of the known filter presses lies in that the filter cloth is not regenerated to its original condition in the course of operation.

The aforesaid disadvantages reduce considerably the filter press capacity and hamper its operation.

An object of the present invention resides in eliminating the above-mentioned disadvantages.

Another object of the present invention is to provide a filter press in which, owing to successive movement of the filter plates, the cake is unloaded entirely without the use of manual labor and which ensures a high output and ease of operation.

According to these and other objects, each filter plate in the filter press, according to the invention, has guide rollers on the upper and lower parts thereof, and is limited by a concave draining surface on one side and by a flat draining surface on the other, while the filter cloth in the form of a continuous band passes consecutively between adjacent filter plates so that, resting on the guide rollers, it covers twice the concave draining surface of each plate and when these plates are moved apart along the longitudinal axis of the set, the length of the band adjoining the moved filter plate is shifted with relation to the latter, carrying outward the cake formed in the filtering chamber.

The best solution of the problem is achieved by securing a watertight elastic diaphragm on each filter plate, at its side limited by a flat surface, said diaphragm installed so that it defines a space for receiving the working fluid forced into it while the cake is being pressed in the filtering chamber.

In such a design, the inventive filter ensures complete unloading of the cake from the filtering chambers without the use of manual labor, regeneration of the filter cloth within the working cycle, a high output and ease of operation.

Now the invention will be described by way of example with reference to the accompanying drawings, in which:

FIG. 3 is a section taken along line III—III in FIG. 2, partly cut away and enlarged;

FIG. 4 is a section taken along line IV—IV in FIG. 2 enlarged;

Figure 1:
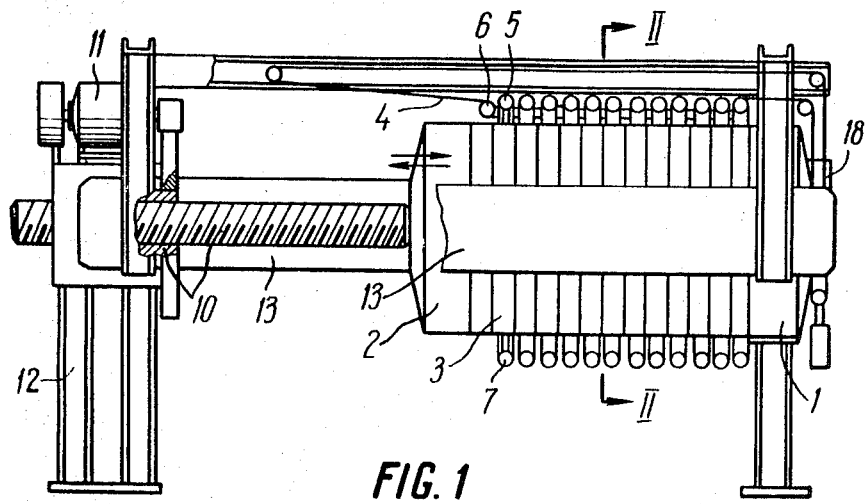
FIG. 1 is a schematic side view of the inventive filter press.

The inventive filter press comprises a set of vertical filter plates 3 (FIGS. 1 through 5) clamped between the thrust plate 1 (FIG. 1) and pressure plate 2, said plates being covered with filter cloth 4. Each filter plate 3 has, according to the invention, guide rollers 5, 6 and 7 (FIGS. 1,2,5) on its upper and lower parts and is limited by a concave draining surface A' (FIGS. 3,4,5) on one side and by a flat surface B on the other. The filter cloth 4 in the form of a continuous band passes consecutively between the adjacent filter plates 3 so that, resting on the guide rollers 5, 7 and 6 (FIG. 5), it covers twice, i.e., in two layers the concave draining surface A of each plate 3.

The set of clamped filter plates 3 forms filtering chambers 8 for the supply of suspension, formation of cake on the filtering cloth and discharging the filtrate through the concave draining surface A.

As the plates 3 are spread one after another in the direction of the longitudinal axis of the set, the lengths A and B of each cloth band 4 adjoining the plate 3 being moved are shifted with relation to the latter, carrying out the cake.

In the example considered here, the filter plates 3 are of welded construction while the concave draining surface A for discharging the filtrate is constituted by a perforated plate.

The plates 3 may also be of cast construction; in this case their concave surfaces for the discharge of the filtrate are fluted.

Figure 5:
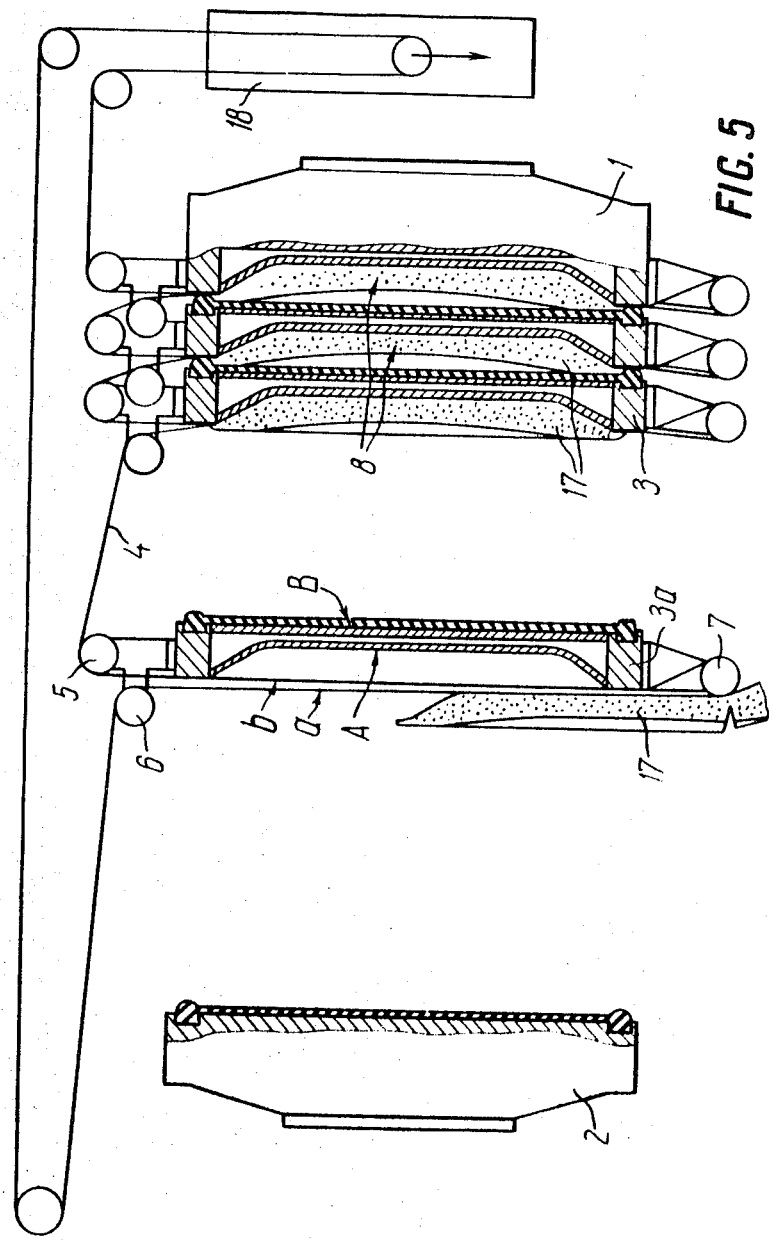
FIG. 5 shows the layout diagram of the filter cloth band.

It can be seen in FIG. 5 that the filter cloth 4 is an endless band.

However, the filter cloth 4 may also be made in the form of a band whose ends are secured to drums installed at the sides of the thrust plate 1 and pressure plate 2.

According to the invention, each filter plate 3 at the side thereof limited by the flat surface, B, is provided with an elastic watertight diaphragm 9 (FIGS. 3 and 4) so that this diaphragm forms, together with the plate, a space for the working fluid which is forced in while the cake is being pressed in the filtering chamber 8.

The plates may be shifted in the direction of the longitudinal axis of the set by a chain drive or by any other known mechanism which is not shown in the drawing, in order to simplify the latter.

The set of filter plates 3 (FIG. 1) together with the filter cloth 4 is clamped by the pressure plate 2 operated by a screw-and-nut pair 10 which is linked kinematically with a motor 11 and mounted on an upright 12 secured by tie rods 13 (FIGS. 1 and 2) to the thrust plate 1.

The filter press functions as follows.

Figure 2:
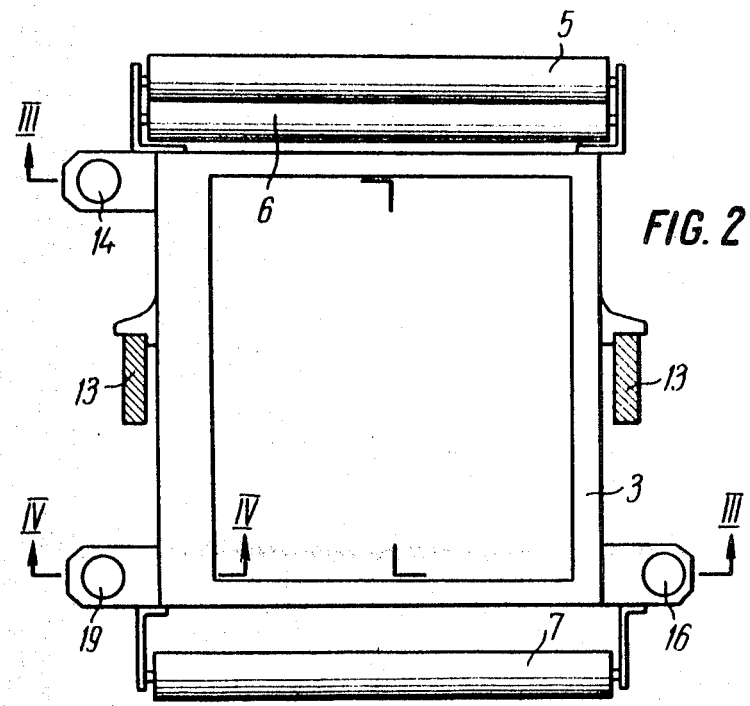
FIG. 2 is a section taken along line II—II in FIG. 1, enlarged.

A set of vertical filter plates 3 with the filter cloth 4 is clamped between the thrust plate 1 and the pressure plate 2 with the aid of a screw-and-nut pair 10. This forms filtering chambers 8 into which suspended matter is forced in the direction of the arrow C through the passage 14 (FIGS. 2 and 3). The liquid phase of the suspension passes through the filter cloth 4 and perforated wall 15, being then directed along the arrow D into the filtrate discharge passage 16.

The solid phase of the suspension settles on the filter cloth 4 (FIG. 5) in the form of cake 17 which fills the filtering chambers 8.

As the filtering chambers 17 become gradually filled with cake, the supply of suspension is discontinued. The liquid contained in the cake is extracted (dried) by compressed air delivered through the passage 14 in the direction of arrow C. Then the air supply is cut off, the pressure plate 2 is relieved of the pressure applied to it by the screw-and-nut pair 10, after which the pressure plate 2 is withdrawn from the set of filtering plates 3, by moving it along the longitudinal axis of the set over a distance which is equal to, or somewhat larger than the distance between the rollers 5 and 7 (FIGS. 1 and 5).

Then the plate 3a (FIG. 5) located immediately after the pressure plate 2 is moved until said plate 3a comes into contact with the plate 2. During the movement of the plate 3a the lengths A and B of the filter band 4 adjoining the plate 3a are shifted with relation to it, carrying the cake 17 outside.

The cake 17 is separated from the cloth 4 and thrown off due to bending of the cloth band 4 around the guide roller 7.

Inasmuch as the plate 3a (or any other subsequent filter plate) covers a distance which is equal to, or somewhat larger than, the distance between the guide rollers 5 and 7, while the plates adjoining the moved plate 3a remain stationary, the length A of the cloth band 4 takes the place of the length B and its clogged side turns to the concave draining surface A of the plate. During the next cycle the filter cloth 4 will be washed with filtrate which will ensure reversible regeneration of the filter cloth. This extends the life of the filter cloth thus contributing to stable output of the filter press.

After the plate 3a is moved as described above, all the other filter plates are moved in succession. Then the set of filter plates is returned, together with the pressure plate 2, to their initial position and the length of the clogged filter cloth 4 enters the chamber 18 for regeneration.

The set of filter plates 3 is again clamped and a new working cycle is started.

As can be seen from the above description, the design of the filter press according to the invention allows complete unloading of the cake by moving the plates without the use of manual labor which increases the filter output owing to a shorter time required for unloading the cake, and permits mechanization and automation of the filter press, thus improving the labor conditions.

In most cases, the suspensions form a cake which cracks up from being dried in the filtering chamber with compressed air which results in undue expenditure of compressed air. Besides, the cake in this case may have a high moisture content which hampers complete separation of the cake from the filter band.

In consequence of this, it is practicable that the cake be pressed in the filtering chamber before the air is fed in for drying the cake. For this purpose the working fluid (a liquid or air) is fed in the direction of arrow E through the passage 19 (FIGS, 2 and 4) into the space formed by the flat surface B of the plate 3 and the diaphragm 9.

Owing to an increase in the volume of this space, the cake is squeezed in the filtering chamber 8.

This reduces the moisture content of the cake considerably which facilitates its separation from the cloth and reduces the consumption of air for drying, sometimes even eliminating the necessity for its use altogether.

It should be noted that the use of the diaphragm 9 is also practicable when it becomes necessary to change the thickness of the cake which makes it possible to adjust the filter press for an optimum service duty and to employ it efficiently for the separation of various types of suspensions, at the same time ensuring a maximum output.

After the cake has been squeezed out, the air is fed through the passage 14 for drying the cake. Then the entire process is repeated over again as described above.

The filter press according to the invention is so designed that the cake can be unloaded entirely without the use of manual labor.

What we claim is:

1. A filter press comprising: a thrust plate and a pressure plate; a set of filter plates arranged vertically between said thrust and pressure plates, each of said filter plates being limited by a flat draining surface on one side thereof and a concave draining surface on the other side thereof; guide rollers mounted on the upper and lower parts of said filter plates; filter cloth in the form of a continuous band passing consecutively between adjacent filter plates so that, resting on said rollers, it covers said concave draining surface of each filter plate in two layers; filtering chambers constituted between said filter plates when said plates are clamped in the working position together with said filter cloth between said thrust and pressure plates, and intended to receive the suspension and form the cake; the length of said filter cloth adjoining the filter plate being moved adapted to be shifted with respect to the latter when said filter plates are spread apart one after another along the longitudinal axis of said plate set, thereby carrying outward the cake formed in the filtering chamber.

2. A filter press according to claim 1 wherein each filter plate has an elastic watertight diaphragm on the side limited by the flat surface, said diaphragm being secured so that it forms, together with said flat surface, a space for the working fluid which is forced in for pressing the cake in the filtering chamber.